United States Patent [19]
Fromfield

[11] 4,058,287
[45] Nov. 15, 1977

[54] PILOT-OPERATED VALVE HAVING CONSTANT CLOSING RATE

[75] Inventor: James P. Fromfield, Belleville, N.J.

[73] Assignee: Automatic Switch Company, Florham Park, N.J.

[21] Appl. No.: 615,139

[22] Filed: Sept. 19, 1975

[51] Int. Cl.² ............................................. F16K 31/385
[52] U.S. Cl. ........................................ 251/46; 251/33
[58] Field of Search ..................... 251/45, 44, 33, 46, 251/43, 34; 137/489, 491

[56] References Cited
U.S. PATENT DOCUMENTS

| | | | |
|---|---|---|---|
| 2,747,606 | 5/1956 | Adams et al. | 137/489 |
| 2,870,986 | 1/1959 | Vargo | 251/45 |
| 3,103,338 | 9/1963 | Marmo | 251/45 |
| 3,794,060 | 2/1974 | Perkins | 251/120 |

Primary Examiner—Arnold Rosenthal
Attorney, Agent, or Firm—Alan H. Levine

[57] ABSTRACT

A valve having a valve body formed with an internal orifice between the valve inlet and outlet ports, and a main valve member for opening and closing the orifice. A chamber above the valve member is supplied with high pressure fluid through a bleed passageway extending between the chamber and the inlet port. A pilot valve controls exhausting of the chamber when the main valve is to be opened. A flow control element in the bleed passageway maintains a constant rate of fluid flow for filling the chamber, to close the main valve, regardless of the pressure differential across the flow control element. The bleed passageway may be in either the valve body or the main valve member. The flow control element may be an annular rubber washer.

7 Claims, 6 Drawing Figures

PILOT-OPERATED VALVE HAVING CONSTANT CLOSING RATE

This invention relates to pilot-operated valves, and more particularly to an improvement in such valves whereby the rate at which they close is controlled.

A pilot operated valve includes a main valve member arranged to open or close an internal orifice so as to permit or prevent, respectively, fluid flow from the high pressure inlet port to the low pressure outlet port. A chamber on the side of the valve member opposite the orifice communicates through a bleed passageway with the inlet port. The chamber also communicates through a small pilot valve with a low pressure region, such as the outlet port. When the pilot valve is closed, high pressure fluid fills the chamber through the bleed passageway, and when the pressure in the chamber rises to a high enough level, it forces the the main valve member to close the orifice, thereby closing the main valve. When the pilot valve is opened, the fluid pressure in the chamber is relieved, and the main valve member moves to open the orifice.

In conventional valves of the type just described, the rate at which the main valve closes depends upon the differential in pressures at opposite ends of the valve. For example, if the inlet pressure is very high as compared to the outlet pressure, fluid flows through the bleed passageway at a rapid rate and quickly fills the chamber to a pressure high enough to close the main valve. In such a case, the main valve closes almost instantly after the pilot valve is closed. On the other hand, if the differential between the inlet and outlet pressures is smaller, a longer time will pass before fluid flowing from the inlet port to the chamber through the bleed passageway raises the pressure in the chamber to a level sufficient to close the main valve.

A disadvantage presented by such valves occurs when it is used with high pressure differentials. In such a case, the chamber fills so rapidly that the main valve member is slammed against the valve seat surrounding the orifice very quickly, and as a result, fluid flow through the valve is stopped so abruptly as to cause a hydraulic shock, commonly referred to as "water hammer", in the fluid line controlled by the valve.

It is possible to overcome this problem by making the diameter of the bleed passageway very small. However, this expedient presents a number of other problems. A very small diameter passageway has a tendency to become clogged more easily than a larger passageway with foreign matter which enters the valve along with the fluid being controlled. Also, although a small diameter bleed passageway insures a slow closing of the valve even when high pressure differentials are involved, the rate of valve closing is still dependent upon the pressure differential, and should the differential decrease for some reason, the main valve will take an inordinantly long time to close.

It is an object of the present invention to overcome all of these problems by providing a pilot-operated valve which closes at a constant preselected slow rate regardless of the pressure differential across the valve.

It is another object of the invention to provide such a valve which substantially eliminates "water hammer" in the line controlled by the valve as a result of closing the valve.

It is a further object of the invention to provide such a valve having a flow control element in the bleed passageway which maintains a constant rate of flow from the inlet port to the chamber regardless of the pressure differential across the flow control element.

It is an additional object of the invention to provide such a valve wherein the flow control element is self-adjusting to automatically maintain the constant flow rate in response to variations in pressure differential across it.

It is another object of the invention to provide such a valve wherein the flow control element is self-cleaning so as to minimize clogging by foreign matter.

Additional objects and advantages of the invention will be apparent from the following description in which reference is made to the accompanying drawings.

In the drawings

Figure 1:
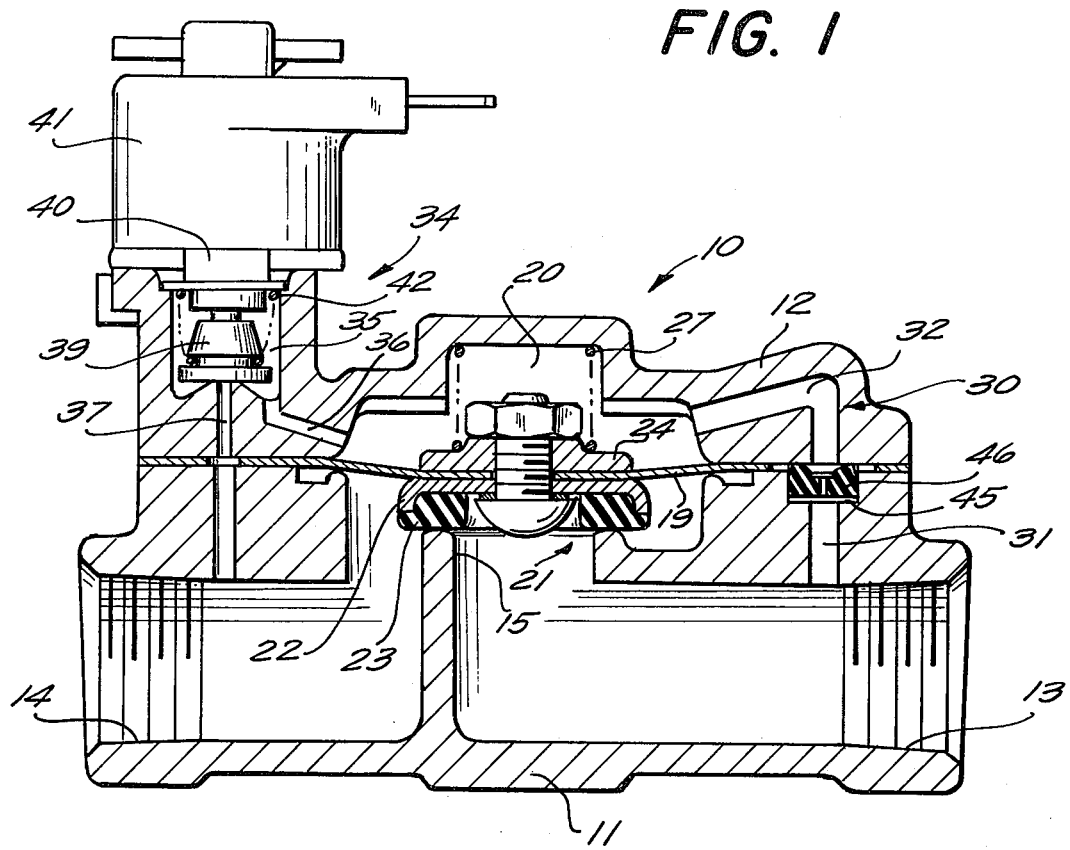
FIG. 1 is a cross-sectional view of a pilot-operated valve incorporating a flow control element according to the present invention, the main and pilot valves being closed.

The pilot-operated valve 10 chosen to illustrate the present invention, and shown in FIGS. 1-4, includes a valve body comprising a lower valve body portion 11 and an upper valve body portion, or bonnet, 12. The body portions 11 and 12 are held together by suitable fastening means such as bolts (not shown). Lower body portion 11 is formed with an internally threaded inlet port 13, for connection to a conduit leading to a source of high pressure fluid, and an internally threaded outlet port 14, for connection to a conduit within which the flow of fluid is to be controlled by the valve 10. Within body portion 11, between ports 13 and 14, is an orifice 15 surrounded by a valve seat 16.

A main valve member, which may be a resilient diaphragm 19 made of rubber, extends across the interior of the valve body above valve seat 16, the margin of the diaphragm being sandwiched between the body portions 11 and 12. Diaphragm 19 and body portion 12 cooperate to define a chamber 20 on the side of the diaphragm opposite the side which faces valve seat 16. At its center, diaphragm 19 carries on its lower face a main valve member 21, comprising a metal washer 22 having a turneddown edge faced with resilient material 23, such as rubber. A metal back-up plate 24 is arranged against the upper face of diaphragm 19, and a bolt 25 and nut 26 hold together the assembly of diaphragm 19, valve member 21, and plate 24. A compression spring 27, between body portion 12 and back-up plate 24, constantly urges main valve member 21 toward valve seat 16.

In this example, a bleed passageway 30 is provided in the valve body between inlet port 13 and chamber 20. The bleed passageway 30 includes a passageway portion 31 in body portion 11 and a cooperating passageway portion 32 in body portion 12.

Upper body portion 12 supports a pilot valve 34 for controlling the flow of fluid out of chamber 20. Pilot valve 34 includes a chamber 35 which communicates with chamber 20 through passageway 36, and which communicates with outlet port 14 through passageway 37, part of which is formed in body portion 12 and part in body portion 11. A valve seat 38 (FIG. 2) surrounds the end of passageway 37 which terminates in chamber 35, and is engageable by a vertically-movable pilot valve member 39 secured to the lower end of an armature 40 movable by an electric solenoid 41. Although a solenoid is shown for actuating pilot valve member 39, obviously other types of electrical, pneumatic, and hydraulic actuators can be employed. A compression spring 42 constantly urges pilot valve member 39 toward pilot valve seat 38.

Figure 3:
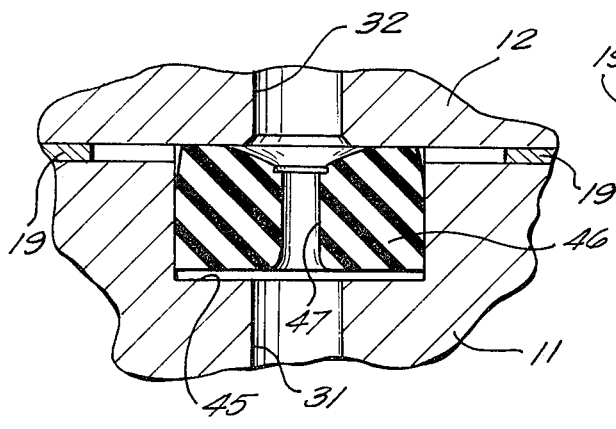
FIG. 3 is a fragmentary view, on an enlarged scale, showing the flow control element when there is no pressure differential across it.
Figure 4:
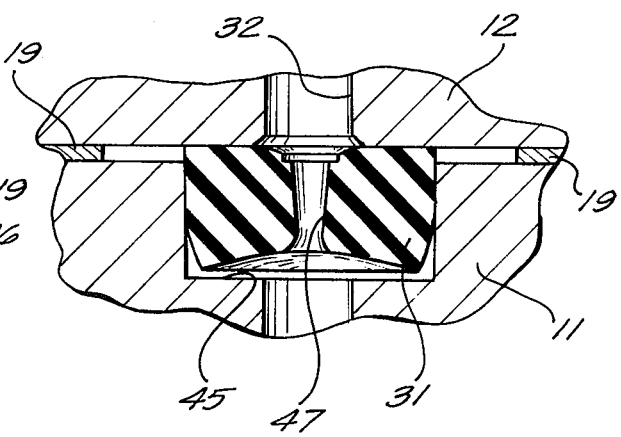
FIG. 4 is a view similar to FIG. 3 when there is fluid flow through the flow control element.

At its upper end, bleed passageway portion 31 is enlarged to define a recess 45 for accommodating a flow control element 46 (see FIGS. 3 and 4). In this example, the flow control element is of the type comprising an annular rubber washer, such as is described and illustrated in U.S. Pat. Nos. 2,389,134; 2,454,929; and 2,775,984. A flow control element similar to that of the latter patent is shown in the present drawings. Element 46 has a central orifice 47 through which fluid flows from passageway portion 31 to passageway portion 32. Element 46 controls flow by reduction in the cross-sectional area of orifice 47 upon increases in the pressure differential across the element. The reduction in the size of orifice 47 is caused by the flexure of element 46 (compare FIGS. 3 and 4), and the greater the pressure differential, the more element 46 flexes, and the smaller orifice 47 becomes. Thus, regardless of the pressure differential, the fluid flow rate through orifice 47 always remains constant.

When the valve is closed, as shown in FIG. 1, inlet pressure from port 13 is present in chamber 20, and the force of this pressure combined with the force of spring 27 holds the facing 23 of main valve member 21 against valve seat 16. Consequently, no flow is permitted from port 13 to port 14. In addition, pilot valve member 39 is seated on pilot valve seat 38, thereby preventing flow from chamber 20 to outlet port 14. Furthermore, there is no flow through bleed passageway 30, and hence no pressure differential across control element 46. Consequently, the element is not flexed and is in the condition shown in FIGS. 1 and 3.

Figure 2:
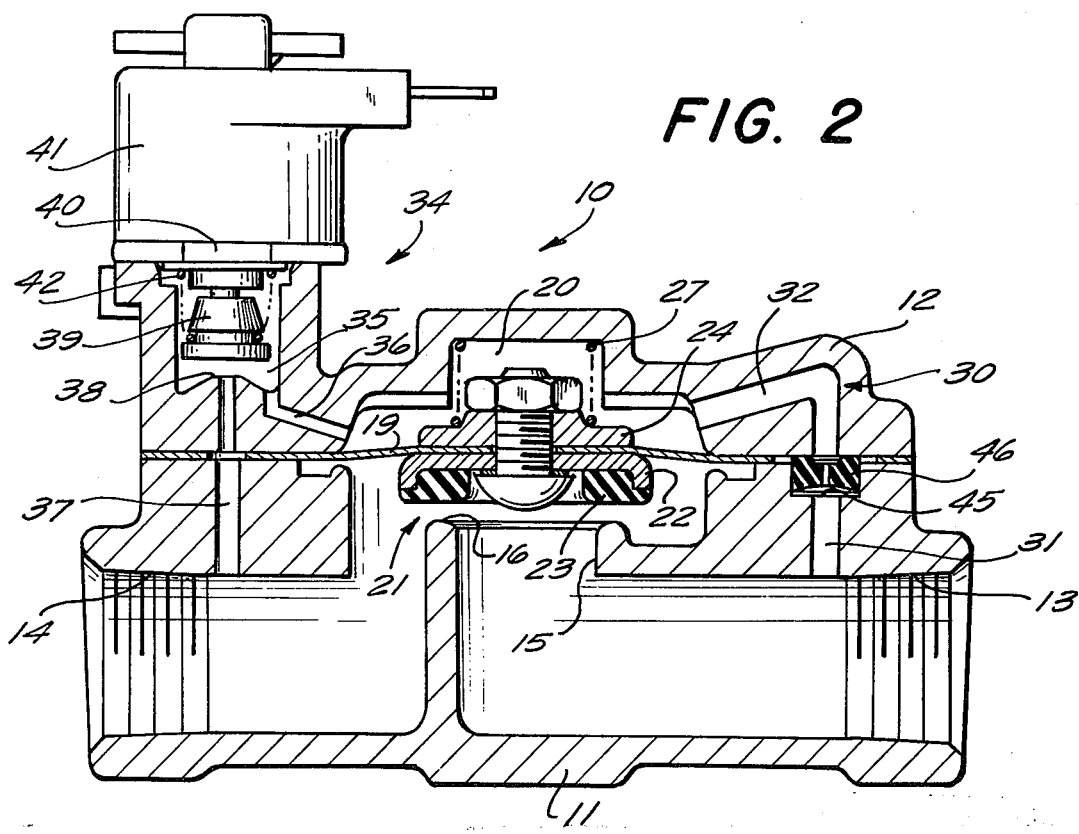
FIG. 2 is a view similar to FIG. 1 showing the main and pilot valves open.

When solenoid 41 is energized, pilot valve member 39 rises (FIG. 2), and the high pressure fluid rushes out of chamber 20 through passageways 36 and 37 to outlet port 14. This relieves the pressure in chamber 20, and the inlet pressure beneath main valve member 21 causes the latter to rise off valve seat 16 (FIG. 2). As a result, the main valve is opened and flow takes place from port 13 to port 14. Also, fluid at the inlet pressure now flows through bleed passageway 30 and orifice 47 of element 46 into chamber 20. This does not alter the condition of the valve, since the fluid immediately leaves chamber 20 through passageways 36 and 37. However, since at this time there is a pressure differential across flow control element 46, the latter flexes as shown in FIGS. 2 and 4 to reduce the cross-sectional area of orifice 47.

When it is desired to close the valve, solenoid 41 is deenergized, permitting spring 42 to move pilot valve member 39 into engagement with pilot valve seat 38. Thereafter, no fluid can leave chamber 20. However, fluid at inlet pressure continues to flow into chamber 20 through bleed passageway 30 and orifice 47. When the pressure in chamber 20 rises to a high enough level, the force produced by this pressure combined with the force of spring 27 overcomes the inlet pressure force below diaphragm 19, and main valve member 21 moves into engagement with main valve seat 16. The size of orifice 47 is chosen so that chamber 20 fills up slowly after the pilot valve is closed. In this way, the main valve is closed slowly, and hydraulic shock in the line connected to inlet port 13 is avoided. Furthermore, chamber 20 will fill at the same slow rate, and hence the main valve member 21 will move toward seat 16 at the same slow rate, regardless of the value of the pressure at inlet port 13. This is because the fluid flow rate through the orifice 47 of flow control element 46 always remains constant regardless of the pressure applied to its upstream end.

Figure 5:
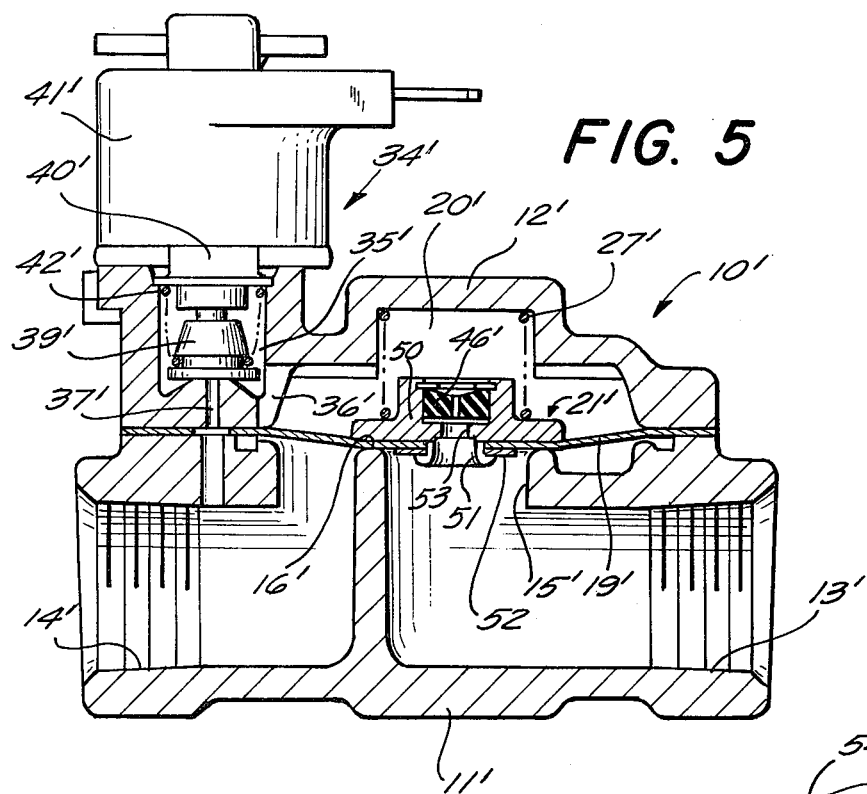
FIG. 5 is a cross-sectional view of an alternative embodiment of a pilot-operated valve incorporating a flow control element according to the present invention.
Figure 6:
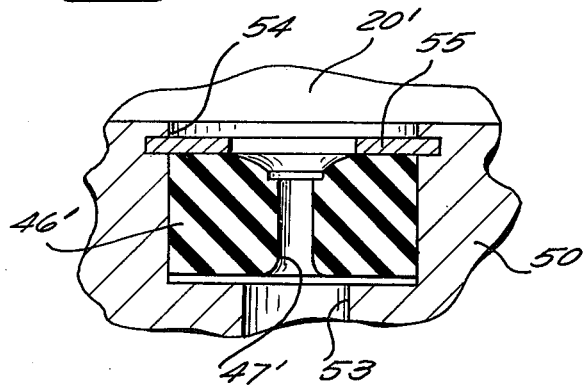
FIG. 6 is a fragmentary view, on an enlarged scale, showing the flow control element of FIG. 5.

In the embodiment of FIGS. 1–4, the bleed passageway 30 and flow control element 46 are located within the body of valve 10. FIGS. 5 and 6 show an alternative embodiment of the invention which is identical to the embodiment of FIGS. 1–4, except that the bleed passageway and flow control element are arranged in the main valve member instead of in the valve body. The parts of the valve of FIGS. 5 and 6 which are comparable to those of the FIGS. 1–4 valve bear the same reference numerals followed by a prime.

In the alternative embodiment, the main valve member 21' includes diaphragm 19' which is moved into and out of engagement with main valve seat 16'. A back-up plate 50 supports the portion of the upper face of diaphragm 19' directly over valve seat 16'. Back-up plate 50 has a tubular extension 51 projecting downwardly through a hole in the diaphragm and through a washer 52 arranged against the lower face of the diaphragm. The lower end of extension 51 is turned outwardly to hold the plate 50, diaphragm 19', and washer 52 together.

The hollow interior of extension 51 and a bore 53 in back-up plate 50 constitute the bleed passageway, which merges into an enlarged recess 54 formed in plate 50. Recess 54 accommodates a flow control element 46' having an orifice 47' aligned with the bleed passageway. To prevent element 46' from being accidentally pushed out of recess 54, a retainer such as a snap ring 55 is arranged above the element in an annular groove within the recess. Valve 10' operates exactly the same way that valve 10 operates, except that chamber 20' is filled with high pressure fluid from inlet port 13' through the interior of extension 51, bore 53, and orifice 47'.

Since flow control element 46, 46' flexes each time the valve is opened or closed, it tends to free any foreign matter which may become lodged in orifice 47, 47', thereby preventing the orifice from remaining clogged. This advantage is not present when a fixed bleed orifice is employed.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:
1. A valve comprising:
   a. a valve body having an inlet port for connection to a high pressure region, an outlet port for connection to a low pressure region, and an orifice between said ports surrounded by a valve seat, b. a main valve member movable into and out of engagement with said valve seat to close and open said valve, respectively, c. a chamber within said valve body on the side of said main valve member opposite the side which faces said valve seat, d. a pilot valve operable independently of the pressure in said chamber for controlling communication between said chamber and a region where the pressure is low as compared to the high pressure at said inlet port, e. a bleed passageway in said valve body through which said inlet port communicates with said chamber, and f. a flow control element, in the form of an annular washer of resilient material, within said bleed passageway for mantaining a constant rate of fluid flow through said bleed passageway regardless of the pressure differential between the high and low pressure regions.

2. A valve as defined in claim 1 wherein said bleed passageway is formed with an enlarged recess, and said flow control element is within said recess.

3. A valve as defined in claim 1 wherein said flow control element is self-adjusting to automatically maintain a constant fluid flow rate in response to variations in the pressure differential across it.

4. A valve as defined in claim 1 wherein said pilot valve comprises a pilot valve chamber within said valve body, passageways in said valve body through which said pilot valve chamber communicates with said chamber (c) and with said outlet port, and a pilot valve member within said pilot valve chamber for controlling fluid flow through said passageways.

5. A valve comprising:
a. a valve body having an inlet port for connection to a high pressure region, an outlet port for connection to a low pressure region, and an orifice between said ports surrounded by a valve seat, b. a main valve member movable into and out of engagement with said valve seat to close and open said valve, respectively, c. a chamber within said valve body on the side of said main valve member opposite the side which faces said valve seat, d. a pilot valve for controlling communication between said chamber and a region where the pressure is low as compared to the high pressure at said inlet port, e. a bleed passageway, within said main valve member, through which said inlet port communicates with said chamber, and f. a flow control element, in the form of an annular washer formed of resilient material, within said bleed passageway for maintaining a constant rate of fluid flow through said bleed passageway regardless of the pressure differential between the high and low regions.

6. A valve as defined in claim 5 wherein said pilot valve comprises a pilot valve chamber within said valve body, passageways in said valve body through which said pilot valve chamber communicates with said chamber (c) and with said outlet port, and a pilot valve member within said pilot valve chamber for controlling fluid flow through said passageways.

7. A valve comprising:
a. a valve body having an inlet port for connection to a high pressure region, an outlet port for connection to a low pressure region, and an orifice between said ports surrounded by a valve seat, b. a main valve member movable into and out of engagement with said valve seat to close and open said valve, respectively, c. a chamber within said valve body on the side of said main valve member opposite the side which faces said valve seat, high pressure fluid in said chamber tending to move said main valve member into engagement with said valve seat to close said valve, d. a pilot valve for controlling communication between said chamber and a region where the pressure is low as compared to the high pressure at said inlet port, e. a bleed passageway in said valve body through which said inlet port communicates with said chamber, and f. a flow control element, in the form of an annular washer of resilient material, within said bleed passageway for maintaining a constant rate of fluid flow through said bleed passageway regardless of the pressure differential between the high and low pressure regions.

* * * * *